No. 607,956. Patented July 26, 1898.
H. R. ROBERTSON.
LUMBER OR TIMBER RAFT.
(Application filed Jan. 6, 1898.)
(No Model.) 2 Sheets—Sheet 1.
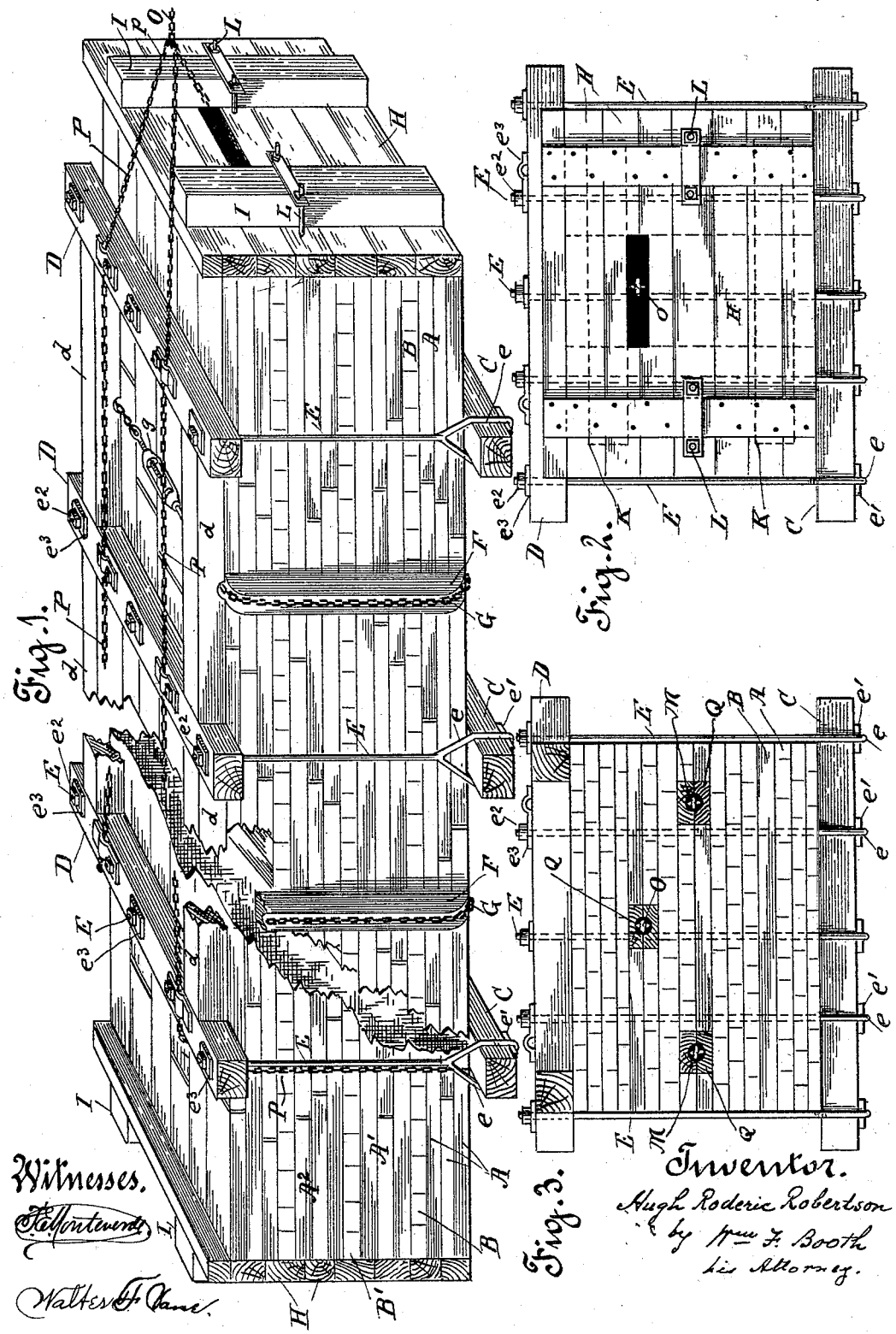
Witnesses.
Inventor.
Hugh Roderic Robertson
by Wm. F. Booth
his Attorney.
THE NORRIS PETERS CO., PHOTO-LITHO., WASHINGTON, D. C.

No. 607,956. Patented July 26, 1898.
H. R. ROBERTSON.
LUMBER OR TIMBER RAFT.
(Application filed Jan. 6, 1898.)
(No Model.) 2 Sheets—Sheet 2.
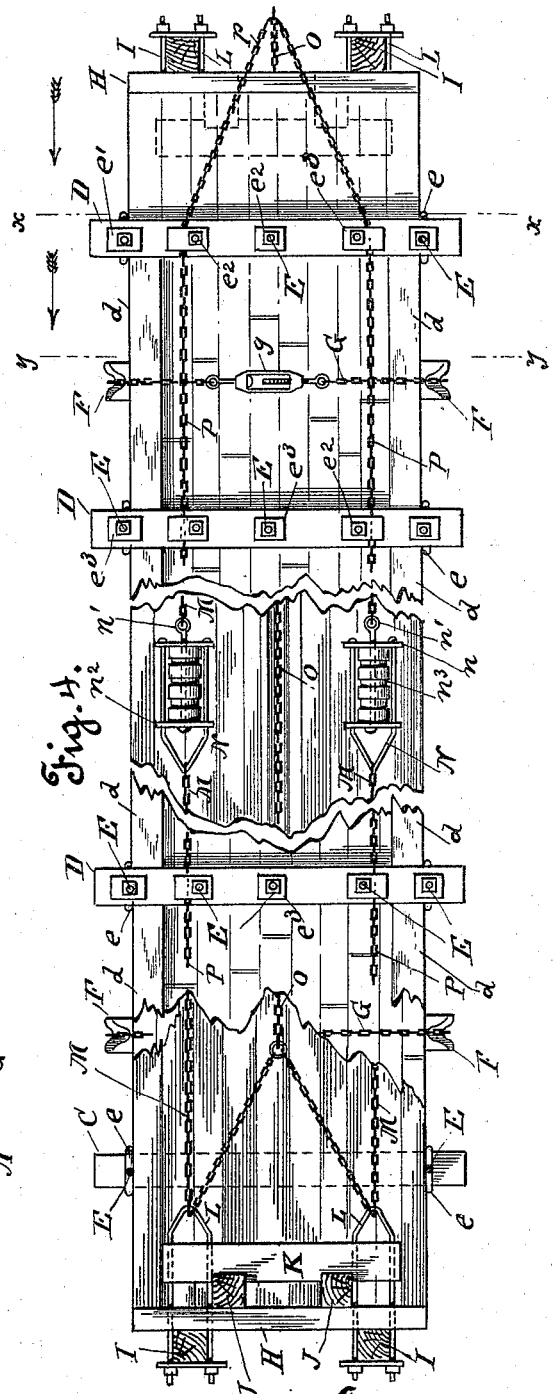
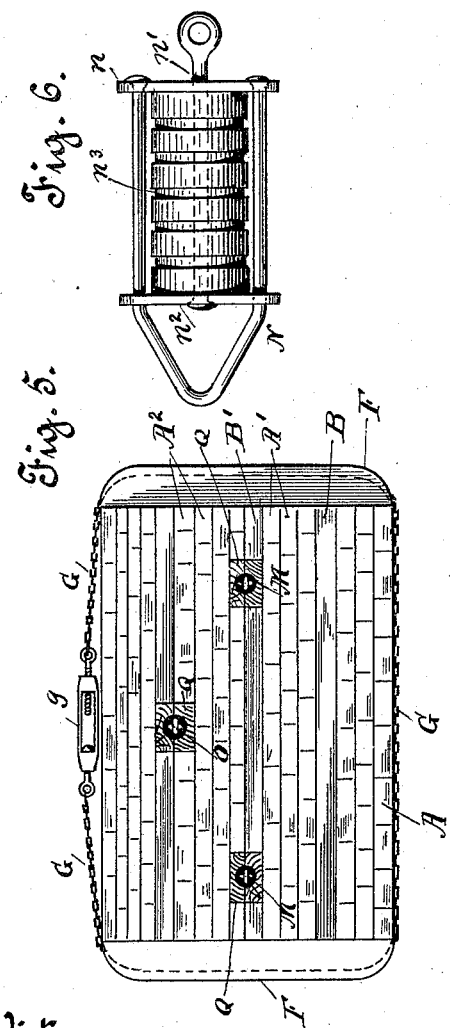
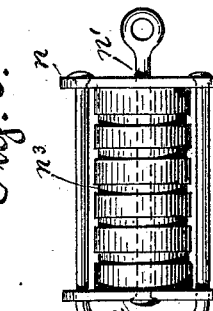
Witnesses.
Inventor.
Hugh Roderic Robertson
by Wm. F. Booth
his Attorney

UNITED STATES PATENT OFFICE.

HUGH RODERIC ROBERTSON, OF ALAMEDA, CALIFORNIA.

LUMBER OR TIMBER RAFT.

SPECIFICATION forming part of Letters Patent No. 607,956, dated July 26, 1898.

Application filed January 6, 1898. Serial No. 665,728. (No model.)

*To all whom it may concern:*

Be it known that I, HUGH RODERIC ROBERTSON, a citizen of Canada, residing at Alameda, in the county of Alameda and State of California, have invented certain new and useful Improvements in Lumber or Timber Rafts; and I do hereby declare the following to be a full, clear, and exact description of the same.

My invention relates to the class of rafts, floats, or structures composed of timbers, planks, boards, lumber, or mass of like material, all so built up and fastened together as to adapt the structure to be transported on the water and especially to be carried on long voyages on the ocean with a view to being broken up and its timber or lumber sold at the place of destination.

My invention consists in the novel structure herein described and claimed, said structure forming a raft or float and composed of boards, planks, or other lumber or timber laid up peculiarly and breaking joints continuously, with novel tie-timbers and fastenings and forming a body or mass of any suitable dimensions, to which are secured novel connecting devices for towing and tightening or adjusting, as required, resisting-bulkheads and other constructions necessary to the successful building and transporting of a lumber or timber raft, all as I shall fully describe.

The object of my invention is to provide a lumber or timber raft adapted for such dimensions as to include a large mass of material and especially a vast number of feet of lumber and so constructed that it can be successfully towed or carried upon the ocean or on any water to a destination at any distance and there to be easily broken up for the sale of its component parts.

Referring to the accompanying drawings, Figure 1 is a perspective view of my raft, portions being broken away to show the several tiers. Fig. 2 is an end view of the raft, showing the bulkhead. Fig. 3 is a cross-section on line $x\ x$ of Fig. 4. Fig. 4 is a plan of raft with parts broken away. Fig. 5 is a section on line $y\ y$ of Fig. 4. Fig. 6 is a detail of the spring connection in the fore-and-aft bulkhead-chains.

The body or mass of the raft is composed in this instance of boards, planks, or other lumber laid up in tiers at right angles or crossing each other. There may be as many layers in each tier as desirable, and no particular regularity in this respect need be observed; but for the mere purpose of illustration I have herein shown the lowermost tier as composed of three layers of boards or planks A, running fore-and-aft. Each layer consists of a floor, as it were, of planks or boards laid side by side and end to end (with sufficient room to bend to the swell of the ocean) to form the length and width of the raft, and in all cases these boards or planks break joints, so that no joints shall be alined, and throughout the whole structure (it may be well to state at this point) the component parts of the mass or body of the raft continuously break joints in all directions, as is indicated in the drawings.

Upon the topmost layer of the bottom tier is laid a crosswise tier, which may be composed of a plurality of layers or, as here shown for illustration, a single layer of boards or planks B. Upon this layer is another tier of fore-and-aft boards A' in one or more layers, then a crosswise tier or layer of boards B', then a fore-and-aft tier of one or more layers of boards A², and so on until the desired height of the structure is attained. As I have said before, no especial regularity or uniformity need be observed with respect to the number of layers forming a tier nor the number of boards to form the tier or the layer, for one thick one may be laid beside two thin ones to attain approximately the same height. The only care is to build up the tier to approximately uniform height throughout its area, so that the general height of the mass may be attained with uniformity and the raft be symmetrical and solid.

Under the body or mass of the raft are cross tie-timbers C at intervals, and in corresponding positions above are cross tie-timbers D. The ends of these tie-timbers C and D project beyond the plane of the raft sides, and long tie rods or bolts E connect the upper ones with the lower ones, there being a number of said rods or bolts connecting each pair of tie-timbers, one each in the projecting ends and several between. These rods or bolts may be secured to the lower tie-timbers in any suitable way, as by passing through them; but I prefer the connection here shown—namely, the stirrups e, embracing the timbers and bearing up to the heavy washer-plates $e'$. By this construction the ties are not weakened. The upper ends of the tie rods or bolts are fitted with tightening-nuts $e^2$ on washers $e^3$, as shown.

In building the raft the proper practice is to construct the skeleton work of cross tie timbers and bolts first and fill in the boards or planks between the tie-timbers and around the bolts. Then tighten the nuts. Now to provide against the liability of the lumber working sidewise against and bending and straining the tie-bolts, especially the outer ones, there are placed against the sides of the raft, preferably at points between the tie-timbers, the pillow-blocks F, in the grooved faces of which lie the encircling chains or cables G, provided with turnbuckles $g$ on top, whereby said chains may be tightened up, thus holding the raft against sidewise strain.

In order to prevent the parts of the raft from working out endwise, there is a bulkhead at each end. Each bulkhead consists of a heavy wall composed of horizontal planks H, spiked to vertical pieces I and covering the whole end of the raft, said planks thus forming a resisting bulkhead or wall against the lengthwise movement of the lumber of which the raft is composed. In connection with and as part of each bulkhead are the two vertical inner or back timbers J, to which the bulkhead-planks are also spiked, and the horizontal timbers K, checked into the timbers J on the inside. Now as the ends of the planks or boards forming the raft are laid in right up to the bulkhead-planks H said ends lie around, on each side of, and above and below the inner timbers J and K, respectively, and thus the timbers J hold the bulkhead from sidewise movement and the timbers K hold it from up and down movement, and thus the bulkheads are perfectly secured to the raft.

To connect the two bulkheads and hold them tightly together, staples L embrace the outer or face timbers I and thence extend through the bulkhead-planks H and into the body of the raft. Secured to the inner ends of these staples and passing fore and aft through the raft are chains or cables M, which at some part in their length are fitted with a compensating device to enable them to lengthen and shorten under the tremendous strain of the raft to bend. Any suitable device may be inserted for this purpose; but I deem the one here shown as practical. It consists, as seen in Fig. 6, of a stirrup N, having a cross-yoke $n$ at one end. Through this yoke passes a slide-rod $n'$, having a sliding head $n^2$. Between this head and the cross-yoke is a heavy spring $n^3$, preferably a rubber piece, which will be protected by an outer ring-sheathing, as shown. To one end of the stirrup one severed end of a chain or cable M is attached, while the other severed end is attached to the rod $n'$. Thus when the raft bends the chains M will yield; otherwise they would snap. The chains may be tightened to the requisite degree by tightening the end staples L by means of their nuts and yokes, as indicated. The final feature of the raft is the towing connection, which, as I shall show, combines the furthur function of tightening the whole raft generally.

O is the tow chain or cable. Its rear end, as shown in Fig. 4, is connected with staples L of the rear bulkhead. It thence passes forward through the raft, gradually rising until it emerges from the forward bulkhead at about the water-line, as seen in Fig. 1.

P is a tightener chain or cable. At the rear or stern end of the raft it embraces the body or mass and thence passes over the top tie-timbers D and is fastened to each, as by shackling to the top washers of the tie-bolts. At its forward end it forms a bight $p$, through which the tow-chain passes from below. Between each adjacent pair of the top tie-timbers are fitted the braces or shores $d$, whereby they are held rigidly with relation to each other. Now in addition to towing from the rear end of the raft with a direct fore-and-aft pull the strain on the tow-chain, acting through the tightening-chain P, will have a tendency to pull the top tie-timbers forwardly, thus tending to lengthen the distance between the upper and the lower tie-timbers, resulting in a general compressing and tightening of the whole mass composing the raft-body.

It is best to carry the several internal chains or cables M and O in grooved housing-planks Q, so that they will not chafe the lumber.

The constructions herein described, going to the securing and fastening the mass or body together, the bulkheads, the towing and tightening device, &c., can be applied, so far as they are applicable, to rafts formed of logs and like timbers, and I do not confine myself to a raft composed of boards or planks or like lumber.

Having thus described my invention, what I claim as new, and desire to secure by Letters Patent, is—

1. A lumber or timber raft having a body composed of a suitably-laid-up mass, and fastening devices comprising top and bottom cross tie-timbers, with vertical tie rods or bolts, provided with tightening means, whereby said timbers are connected and tightened on the mass, and chains or cables encircling the mass and having tightening means, whereby the tie rods or bolts are relieved from side strain.

2. A lumber or timber raft having a body composed of a suitably-laid-up mass, and fastening devices comprising top and bottom cross tie-timbers, with vertical tie rods or bolts, provided with tightening means, whereby said timbers are connected and tightened on the mass, and chains or cables encircling the mass and having tightening means, whereby the tie rods or bolts are relieved from side strain, said chains or cables having pillow-blocks on the sides of the raft and in which they are seated.

3. A lumber or timber raft having a body composed of a suitably-laid-up mass, fastened together in a suitable manner, a bulkhead at each end of the raft to resist endwise displacement, and chains or cables passing fore and aft through the raft and connecting the two bulkheads, said chains or cables having a spring or compensating device let into their length, to permit them to yield under the bending strain of the raft.

4. A lumber or timber raft having a body composed of a suitably-laid-up mass, fastened together in suitable manner, a bulkhead at each end of the raft to resist endwise displacement, and chains or cables passing fore and aft through the raft and connecting the two bulkheads, said chains or cables having a spring or compensating device let into their length, to permit them to yield under the bending strain of the raft, and provided with devices for tightening them.

5. A lumber or timber raft having a body composed of a suitably-laid-up mass fastened together, and a bulkhead for the end of the body, comprising a rigid wall covering the end, and vertical and horizontal timbers on the inner face of said wall with which the ends of the component parts of the raft-body engage, whereby displacement of the bulkhead is prevented.

6. A lumber or timber raft having a body composed of a suitably-laid-up mass fastened together, and a bulkhead for each end of the body, comprising a rigid wall covering the end, and vertical and horizontal timbers on the inner face of said wall with which the ends of the component parts of the raft-body engage, whereby displacement of the bulkheads is prevented, and suitable tightening chains or cables passing through the raft and connecting the bulkheads.

7. A lumber or timber raft having a body composed of a suitably-laid-up mass fastened together, and a bulkhead for each end of the body, comprising a rigid wall covering the end, and vertical and horizontal timbers on the inner face of said wall with which the ends of the component parts of the raft-body engage, whereby displacement of the bulkhead is prevented, and suitable tightening chains or cables passing through the raft and connecting the bulkheads, said chains or cables having let into them a compensating or spring device to permit their adjustment under the bending strain of the raft.

8. In a lumber or timber raft having a body composed of a suitably-laid-up and fastened mass, a bulkhead for each end thereof consisting of outer vertical timbers, a plank wall secured to the inner faces thereof and covering the ends of the raft, vertical and horizontal timbers on the inner face of said wall for engaging the ends of the component parts of the raft-body, to prevent displacement of the bulkhead, and tightening, compensating chains or cables, passing through the raft and connecting the two bulkheads.

9. A lumber or timber raft composed of successive tiers or layers in planes at right angles, fastening devices comprising top and bottom cross tie-timbers with vertical tightening bolts or rods, encircling tightening chains or cables, a bulkhead for each end of the raft consisting of outer vertical timbers, a plank wall secured to the inner faces thereof and covering the ends of the raft, vertical and horizontal timbers on the inner face of said wall for engaging the ends of the component parts of the raft-body to prevent displacement of the bulkhead, and tightening, compensating chains or cables, passing through the raft and connecting the two bulkheads.

10. In a lumber or timber raft having a body composed of a suitably-laid-up mass, fastening devices comprising top and bottom cross tie-timbers with connecting tie rods or bolts, a tow chain or cable, passing through the raft and fastened at the rear end thereof, and a tightening chain or cable secured at the rear end of the raft and secured to the top cross tie-timbers, said chain or cable having a bight at its forward end through which the tow-chain passes.

11. A lumber or timber raft composed of successive tiers or layers in planes at right angles, top and bottom cross tie-timbers with connecting tie rods or bolts, a bulkhead for each end of the raft, cables or chains connecting the bulkheads, a tow chain or cable secured to the rear bulkhead and passing forwardly through the raft, and a tightening chain or cable encircling the rear end of the raft and thence passing forwardly over and secured to the top cross tie-timbers, said chain or cable having a bight at its forward end through which the tow-chain passes.

12. A lumber or timber raft composed of successive tiers or layers in planes at right angles, top and bottom cross tie-timbers with connecting tie rods or bolts, encircling cables or chains about the raft, a bulkhead for each end of the raft composed of a rigid resisting-wall provided with the vertical and horizontal timbers on its inner face, chains or cables connecting the bulkheads and provided with springs let into them, a tow chain or cable secured to the rear bulkhead and passing forwardly through the raft, and a tightening chain or cable encircling the rear end of the raft and thence passing forwardly over and secured to the top cross tie-timbers, said chain or cable having a bight at its forward end through which the tow-chain passes.

13. In a lumber or timber raft having a body composed of a laid-up mass of material, and internal chains or cables passing through it, grooved housings within said body and through which the chains or cables pass, whereby the material is not chafed.

In witness whereof I hereunto set my hand.

HUGH RODERIC ROBERTSON.

Witnesses:
D. B. RICHARDS,
WALTER F. VANE.